US008547243B2

(12) United States Patent
Turnock

(10) Patent No.: US 8,547,243 B2
(45) Date of Patent: Oct. 1, 2013

(54) ELECTRONIC TOLL COLLECTION TRANSPONDER ORIENTATION DEVICE AND METHOD

(75) Inventor: Richard Turnock, Toronto (CA)

(73) Assignee: Mark IV Industries Corp., Mississauga, Ontario (CA)

( * ) Notice: Subject to any disclaimer, the term of this patent is extended or adjusted under 35 U.S.C. 154(b) by 468 days.

(21) Appl. No.: 12/972,164

(22) Filed: Dec. 17, 2010

(65) Prior Publication Data

US 2012/0154164 A1 Jun. 21, 2012

(51) Int. Cl.

| | |
|---|---|
| ***G01B 21/00*** | (2006.01) |
| ***G08B 13/14*** | (2006.01) |
| ***G08G 1/00*** | (2006.01) |
| ***H04Q 5/22*** | (2006.01) |

(52) U.S. Cl.

USPC ........ 340/669; 340/928; 340/572.1; 340/10.1

(58) Field of Classification Search

USPC ......... 340/572.1–572.9, 669, 928, 10.1–10.4, 340/686.19; 343/770; 345/419

See application file for complete search history.

(56) References Cited

U.S. PATENT DOCUMENTS

| | | | | |
|---|---|---|---|---|
| 6,025,799 | A | 2/2000 | Ho et al. | |
| 6,219,613 | B1 | 4/2001 | Terrier et al. | |
| 6,261,427 | B1 * | 7/2001 | Rolfson | 204/224 M |
| 6,661,335 | B1 * | 12/2003 | Seal | 340/10.1 |
| 6,693,511 | B1 * | 2/2004 | Seal | 340/10.1 |
| 7,388,501 | B2 | 6/2008 | Tang et al. | |
| 7,956,725 | B2 * | 6/2011 | Smith | 340/10.1 |
| 2005/0242950 | A1 * | 11/2005 | Lindsay et al. | 340/539.26 |
| 2007/0182578 | A1 * | 8/2007 | Smith | 340/669 |
| 2007/0268140 | A1 * | 11/2007 | Tang et al. | 340/572.4 |

FOREIGN PATENT DOCUMENTS

| | | |
|---|---|---|
| EP | 1453012 | 2/2004 |
| EP | 1675069 | 6/2006 |
| WO | WO2004025574 | 3/2004 |

OTHER PUBLICATIONS

International Searching Authority, "International Search Report and Written Opinion", issued in connection with PCT Application No. PCT/AT2011/050043, Mar. 5, 2012, (11 pages).

* cited by examiner

*Primary Examiner* — Benjamin C Lee
*Assistant Examiner* — Sigmund Tang
(74) *Attorney, Agent, or Firm* — Hanley, Flight & Zimmerman, LLC

(57) ABSTRACT

An electronic toll collection transponder containing an orientation sensor for measuring the orientation of the transponder is described. The transponder measures its orientation and stores orientation data in memory. The transponder may report the stored orientation data as part of a response signal sent to the ETC system in reply to a trigger or polling signal. The transponder may assess whether it is correctly oriented based on a comparison of the orientation data to ranges or thresholds and may output an indicator of incorrect orientation or may disable communications with the ETC system during incorrect orientation.

21 Claims, 7 Drawing Sheets

ELECTRONIC TOLL COLLECTION TRANSPONDER ORIENTATION DEVICE AND METHOD

FIELD OF THE INVENTION

The present invention relates to electronic toll collection (ETC) and, in particular, electronic toll collection transponders and devices and methods for orienting such transponders.

BACKGROUND OF THE INVENTION

Electronic toll collection systems for conducting toll transactions with transponder-equipped vehicles are well known.

An ETC transponder is typically purchased or obtained by a vehicle owner/operator from the operator of the ETC system or an intermediary. The vehicle owner/operator places the ETC transponder within the vehicle. Typically, the ETC transponder is designed to be mounted to the interior of the front windshield of the vehicle. The ETC readers and their respective antennas are positioned so as to "poll" or "trigger" the transponder to send a response signal when the transponder enters a capture zone in a toll processing area of the roadway. The antennas may be mounted on an overhead gantry spanning the roadway in some implementations.

ETC transponders may be battery-powered active transponders in some instances. These transponders may have a hard plastic case. In some instances, the transponder may be designed to be secured to the interior of the windshield, for example using an adhesive. In some cases, the transponder may have a base portion that attaches to the windshield with a permanent adhesive, where the main body and base portion attach using hook-and-loop or other fasteners so as to permit removal of the main body of the transponder from the windshield. In some other instances, the transponders may be passive transponders, often formed on a flexible substrate and colloquially referred to as a "sticker tag". These are designed to be affixed to the interior of the windshield using an adhesive applied to the substrate in the manner of a "sticker".

In many instances, a vehicle owner/operator may affix the ETC transponder incorrectly. For example, the vehicle owner/operator may attach the transponder to the interior of the windshield in the wrong orientation, such that the antenna is turned about 90 degrees from its intended orientation. As another example, the vehicle owner/operator may not affix the transponder to the interior of the windshield, perhaps so as to enable the user to easily move the transponder between vehicles as needed. The vehicle owner/operator may leave the transponder laying flat upon the dashboard of the vehicle, or elsewhere within the vehicle.

The improper orientation of the ETC transponder can negatively affect the ability of the ETC system and transponder to communicate, which can lead to shortened captures zones, or failures of communication between the reader and transponder. This can result in enforcement actions against the vehicle owner/operator, billing disputes, or additional processing costs for the ETC System operator.

BRIEF DESCRIPTION OF THE DRAWINGS

Reference will now be made, by way of example, to the accompanying drawings which show embodiments of the present invention, and in which.

Similar reference numerals are used in different figures to denote similar components.

DESCRIPTION OF SPECIFIC EMBODIMENTS

In one aspect, the present invention provides an electronic toll collection transponder that includes an antenna; a controller, including a transceiver connected to the antenna for receiving and sending RF signals; an orientation sensor configured to output an orientation signal regarding an orientation of the transponder; and a memory storing transponder information. The controller is configured to receive the orientation signal from the orientation sensor and in response thereto to store the orientation data in the memory, and the controller is configured to transmit an RF response signal via the antenna in reply to a receiving polling signal, the RF response signal including the orientation data.

In another aspect, the present invention provides a method of determining orientation of a transponder, the transponder including an orientation sensor, an antenna, memory, and a controller connected to the antenna for receiving and sending RF signals. The method includes receiving an orientation signal from an orientation sensor mounted within the transponder, wherein the orientation signal contains information indicating an orientation of the transponder; storing orientation data within the memory based on the orientation signal; and, in response to receipt of a trigger signal, generating and transmitting an RF response signal, wherein the RF response signal contains includes the orientation data.

In yet another aspect, the present invention provides an electronic toll collection transponder that includes an antenna; a controller, including a transceiver connected to the antenna for receiving and sending RF signals; an orientation sensor configured to output an orientation signal regarding an orientation of the transponder; and a memory storing transponder information, wherein the controller is configured to receive the orientation signal from the orientation sensor and in response thereto to store the orientation data in the memory.

In some example embodiments, the transponder may determine whether it is oriented correctly based upon a comparison of orientation data with predefined ranges or thresholds. A determination of incorrect orientation may result in an output indicator, such as a light, sound or other sensory warning to vehicle occupants. A determination of incorrect orientation may result in disabling of communications from the transponder to the ETC system until corrected.

Other aspects and features of the present invention will be apparent to those of ordinary skill in the art from a review of the following detailed description when considered in conjunction with the drawings.

Figure 1:
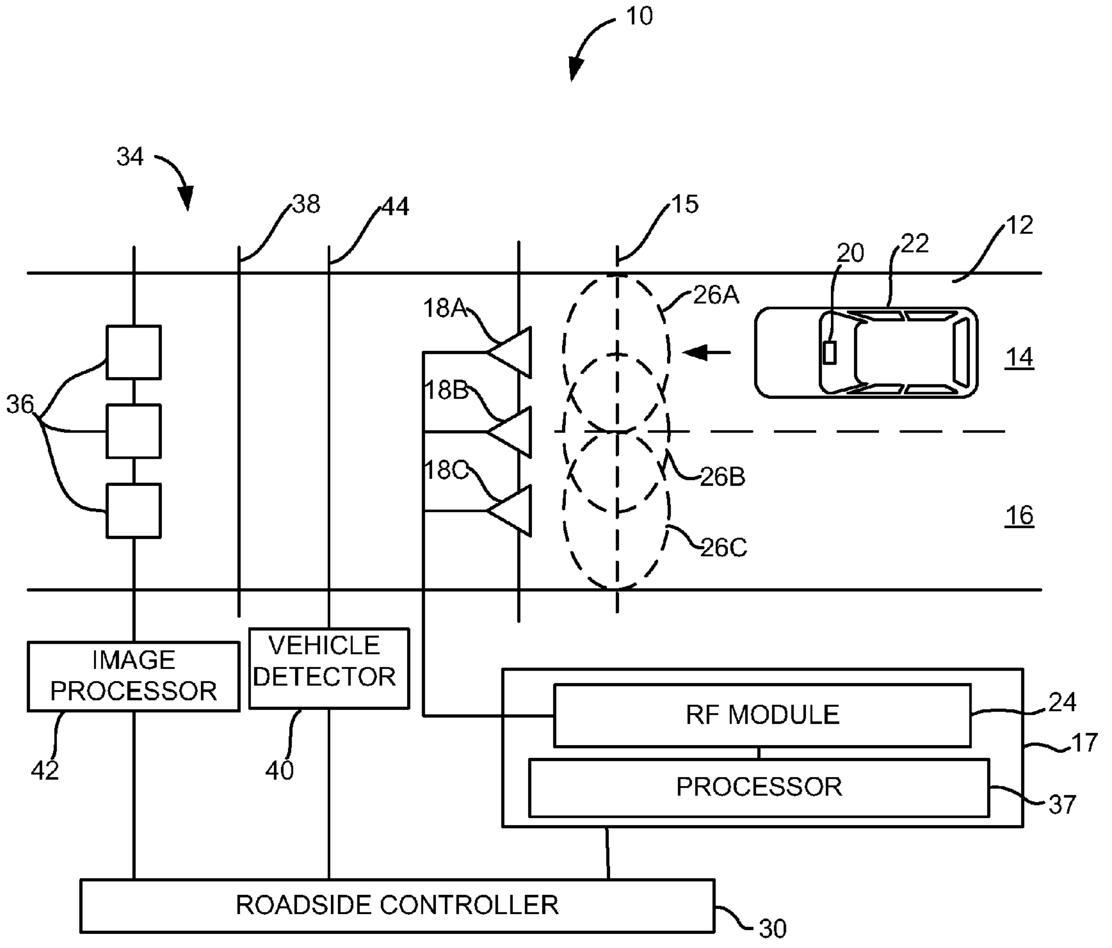
FIG. 1 shows, in block diagram form, an example embodiment of an electronic toll collection system.

With reference to FIG. 1, there is shown a block diagram of an example embodiment of an electronic toll collection system having a transponder communication system, illustrated generally by reference numeral 10. In one embodiment, the electronic toll collection system is associated with a gated toll plaza. In another embodiment, such as that illustrated in FIG. 1, the system 10 is associated with an open-road toll processing zone. Other applications of the electronic toll collection system will be appreciated by those skilled in the art.

As shown in FIG. 1, the electronic toll collection system 10 is applied to a roadway 12 having first and second adjacent lanes 14 and 16. The roadway 12 may be a two lane access roadway leading towards or away from a toll highway. The electronic toll collection system 10 includes three roadway antennas 18A, 18B and 18C, each of which is connected to signal processing means, namely an Automatic Vehicle Identification ("AVI") reader 17. It will be appreciated that other antenna configurations may be used and the number of antennas or the number of lanes may be different than those illustrated in FIG. 1. For example, the exemplary embodiment of FIG. 1 could be modified to eliminate the midpoint antenna 18B so that only two roadway antennas 18A, 18C would be used to provide coverage to the two lanes 14 and 16. The antennas 18A, 18B, 18C may, in some embodiments, be mounted to an overhead gantry or other structure. The antennas in some cases may not be aligned across the roadway but rather offset from each other along the direction of travel.

The AVI reader 17 is a control device that processes signals that are sent and received by the roadway antennas 18A, 18B and 18C. The AVI reader 17 may include a processor 37 and a radio frequency (RF) module 24. The processor 37 may be configured to control communications through the antennas 18A, 18B, 18C. The processor 37 includes a programmable processing unit, volatile and non-volatile memory storing instructions and data necessary for the operation of the processor 37, and communications interfaces to permit the processor 37 to communicate with the RF module 24 and a roadside controller 30.

The RF module 24 is configured to modulate signals from the processor 37 for transmission as RF signals over the roadway antennas 18A, 18B and 18C, and to de-modulate RF signals received by the roadway antennas 18A, 18B and 18C into a form suitable for use by the processor 37. In this regard, the AVI reader 17 employs hardware and signal processing techniques that are well known in the art.

The roadway antennas 18A, 18B and 18C, and AVI reader 17 function to read information from a transponder 20 (shown in the windshield of vehicle 22), to program information to the transponder 20, and to verify that a validated exchange has taken place.

The roadway antennas 18A, 18B and 18C may be directional transmit and receive antennas which, in the illustrated embodiment, have an orientation such that each of the roadway antennas 18A, 18B and 18C can only receive signals transmitted from a transponder 20 when the transponder 20 is located within a roughly elliptical coverage zone associated with the antenna.

The roadway antennas 18A, 18B and 18C are located above the roadway 12 and arranged such that they have coverage zones 26A, 26B and 26C which are aligned along an axis 15 that is orthogonal to the travel path along roadway 12. In the embodiment illustrated, the major axes of the elliptical coverage zones 26A, 26B and 26C are co-linear with each other, and extend orthogonally to the direction of travel. As is apparent from FIG. 1, the coverage zone 26A provides complete coverage of the first lane 14, and the coverage zone 26C provides complete coverage of the second lane 16. The coverage zone 26B overlaps both of the coverage zones 26A and 26C.

It will be understood that although the coverage zones 26A, 26B and 26C are illustrated as having identical, perfect elliptical shapes, in reality the actual shapes of the coverage zones 26A, 26B and 26C will typically not be perfectly elliptical, but will have a shape that is dependent upon a number of factors, including RF reflections or interference caused by nearby structures, the antenna pattern and mounting orientation.

It will also be understood that, although elliptical coverage zones are disclosed in the above embodiment, other shapes could also be used for the coverage areas 26A, 26B or 26C. Furthermore, while three coverage areas 26A, 26B, 26C are shown, the number of coverage areas may vary. Moreover, in some embodiments the coverage area(s) may be much larger than individual lanes; in some cases spanning the entire roadway. In such cases, the ETC system may be configured to communicate with multiple transponders in an antenna coverage area at the same time, perhaps using a carrier sense multiple access (CSMA) scheme or other protocol for communicating with more than one transponder in the same coverage area.

The AVI reader 17 is connected to the roadside controller 30. The roadside controller 30 may process payment/toll transactions and may communicate with an enforcement system to coordinate enforcement actions with vehicles and payments.

In open road toll systems, the electronic toll collection system 10 may include a vehicle imaging system, which is indicated generally by reference numeral 34. The imaging system 34 includes an image processor 42 to which is connected a number of cameras 36, arranged to cover the width of the roadway for capturing images of vehicles as they cross a camera line 38 that extends orthogonally across the roadway 12. The image processor 42 is connected to the roadside controller 30, and operation of the cameras 36 is synchronized by the roadside controller 30 in conjunction with a vehicle detector 40. The vehicle detector 40 which is connected to the roadside controller 30 detects when a vehicle has crossed a vehicle detection line 44 that extends orthogonally across the roadway 12, which is located before the camera line 38 (relative to the direction of travel). The output of the vehicle detector 40 is used by the roadside controller 30 to control the operation of the cameras 36. The vehicle detector 40 can take a number of different configurations that are well known in the art, for example it can be a device which detects the obstruction of light by an object.

As shown in FIG. 1, the electronic toll collection system 10 utilizes a transponder 20 that is located in a vehicle 22 traveling on the roadway 12. The transponder 20 has a transceiver that is configured to de-modulate RF signals received by the transponder antenna into a form suitable for use by a transponder controller. The transceiver is also configured to modulate signals from the transponder controller for transmission as an RF signal over the transponder antenna.

The transponder 20 also includes a memory that is connected to the transponder controller. The transponder controller may access the memory to store and retrieve data. The memory may include volatile memory, non-volatile memory, or both. In one embodiment, the memory is the integrated memory of a microcontroller. In some embodiments, the memory may include shift registers, flash memory, or other computer-readable storage elements. In some instances, the memory may be paged or non-paged.

The memory of the transponder 20 may have a location of memory reserved for storing data which may be altered by the AVI reader 17. This location of memory may include, for example, fields for recording entry and exit points of the vehicle 22 and times and dates of entry or exit of the vehicle 22. It may also include account information which the AVI reader 17 verifies and then debits in an automated parking system, automated drive-through retail outlet, or other mobile commerce system. In the course of an electronic tolling operation, the AVI reader 17 may need to update the memory of the transponder 20.

The memory of the transponder 20 may also contain an area of memory that cannot be updated by the AVI reader 17. For example, the memory may contain fields which are set by the manufacturer or agency deploying the transponders. These protected areas of the memory may contain information related to the characteristics of the transponder 20 or the vehicle 20 or customer.

Other example systems may be "gated" or "closed-road" ETC systems. These types of systems usually have a toll plaza spanning the roadway 16, where individual lanes are separated by islands and, in some cases, toll booths, and where vehicles enter one of the individual lanes. In the individual lanes the toll payment is processed electronically or manually (through exchange of cash with a toll booth operator or automated tool booth), and a successful transaction is indicated by way of indicator lights, the raising of a gate, or other mechanisms. Enforcement mechanisms may also be employed in these types of ETC systems. For example, cameras may be used if a vehicle proceeds through the toll area despite not having received a successful transaction indication on the indicator lights.

It will be appreciated that it is desirable to identify the location of vehicles traversing the communication zones. One reason for identifying the location of a vehicle is to coordinate vehicle identity with enforcement mechanisms. For example if three vehicles pass through a communication zone and two of the vehicles successfully conduct a toll transaction it is necessary for the ETC system to know the locations of the three vehicles for the purpose of determining which vehicle should be subject to enforcement measures, such as photography. For this reason, ETC systems typically perform a "lane assignment" or locator function.

Some existing ETC systems, for example those used in open road installations, may use a pair of 'detector' antenna arrays situated on opposite sides of the roadway and scanning across the communication zone to listen for transponder response signals. The detector antenna arrays are in addition to the other antennas used by readers to actually conduct communications with the transponders and perform ETC transactions. The detector antenna arrays use angle of arrival (AOA) processing to determine the location of a given transponder based on the intersection of the particular beams for each antenna receiving the transponder response signal. In some embodiments, this determination may also or alternatively take into account other factors, such as relative signal strength information, trilateration, time of arrival, or relative phase shifts. An example of a system having detector antenna arrays is described in detail in U.S. Pat. No. 6,025,799 to Ho et al., the contents of which are hereby incorporated by reference. This type of ETC locator system may typically be used in connection with an ETC system operating using a TDMA protocol.

Some other existing ETC systems may not employ separate locator antennas, but instead count the number of transponder response signals received by each antenna in a set of antennas spanning the roadway 16 and determine the vehicle location using a voting algorithm. This type of system requires short tightly defined communication zones for each antenna so that responses received by the antenna may be associated with a certain lane. Such a system is described, by way of example, in U.S. Pat. No. 6,219,613, to Terrier et al., the contents of which are hereby incorporated by reference. This type of system may typically be used in connection with an ETC system operating using the proprietary IAG (Northeastern Inter-Agency Group) protocol for ETC communications.

The controller 30 may be implemented through a combination of hardware and software. For example, in one embodiment, the controller 30 may be realized using a microprocessor and associated memory devices containing a stored program to configure the microprocessor to implement the steps associated with a particular ETC communication and transaction protocol. In another embodiment, the controller 30 may be implemented using a suitably programmed microcontroller or general purpose computing device. In yet another embodiment, the controller 30 may be implemented using one or more application-specific integrated circuits (ASICs). The range of options will be well understood by those skilled in the art. The suitable programming of such devices to realize a given ETC communications protocol will also be within the skill of those ordinarily versed in the art.

The design and operation of a suitable reader, including the design of suitable transceivers, will be within the skill of a person of ordinary skill in the art.

Figure 2:
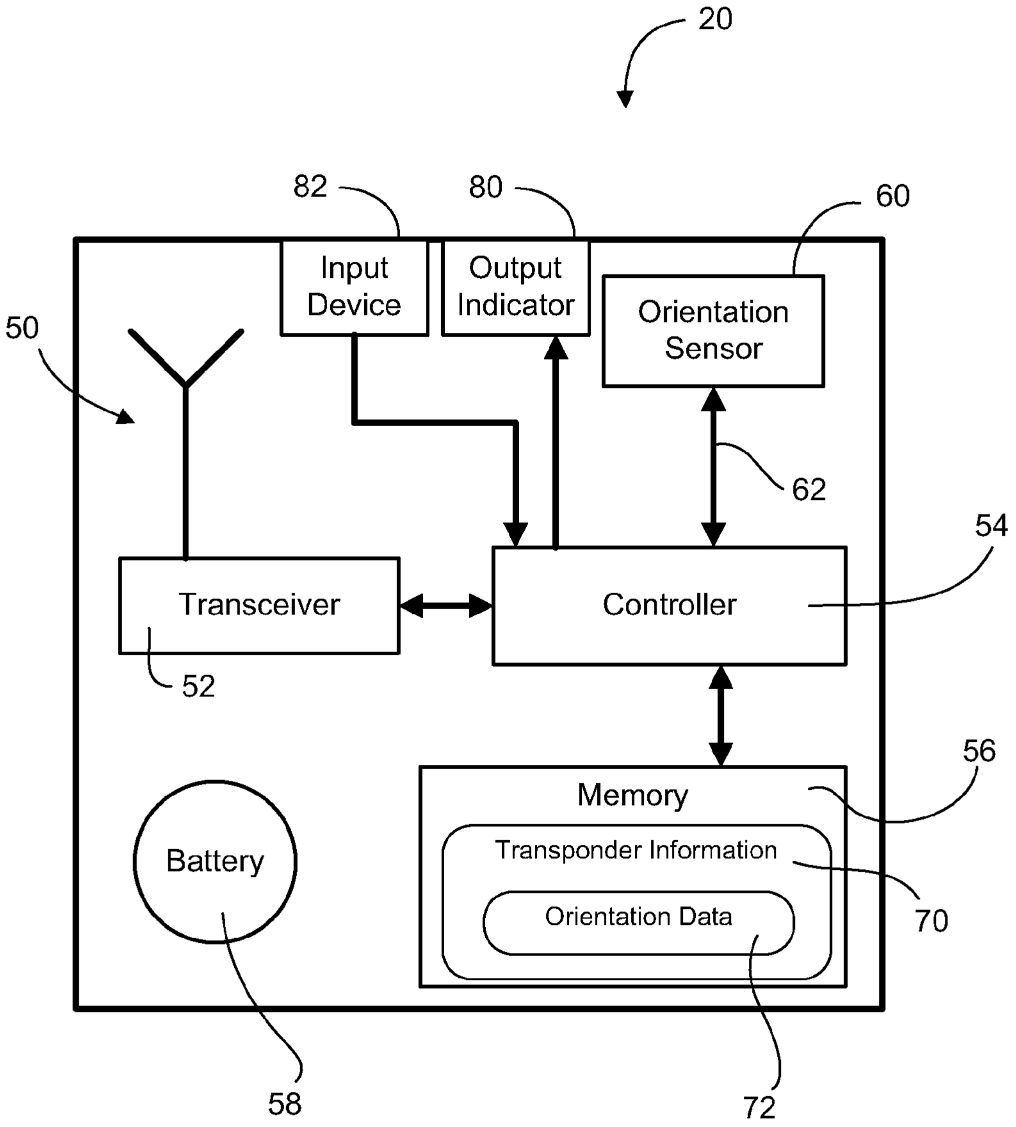
FIG. 2 shows, in block diagram form, an embodiment of a transponder.

Reference is now made to FIG. 2, which shows an example embodiment of the transponder 20. It will be appreciated that this embodiment is an example of an active transponder. The transponder 20 includes an antenna 50, a transceiver 52, and a controller 54. The transceiver 52 is connected to the antenna 50 and is configured to detect and, is some cases, demodulate, RF signals induced in the antenna 50. Example signals may include a polling or trigger signal or a programming signal transmitted by a reader. The controller 54 is connected to and controls the transceiver 52.

The transponder 20 also includes a memory 56. As noted above, the memory 56 may include volatile memory, non-volatile memory, or both. In this example embodiment, the memory 56 includes at least some writable memory locations for storing new data.

In this embodiment, the transponder 20 also includes a battery 58.

The transponder 20 further includes an orientation sensor 60. The orientation sensor 60 outputs an orientation signal 62 to the controller 54. In some instances, the orientation sensor 60 outputs the orientation signal 62 in the sense that it supplies orientation information to the controller 54 when the controller 54 reads the sensor 60. In some instances, the controller 54 may send a read signal or other prompt to the orientation sensor 60 and may receive the orientation signal 62 in reply. In some instances, the orientation sensor 60 may supply the orientation signal 62 on a periodic basis without a read or prompt from the controller 54. Any other variations by which the controller 54 is supplied orientation information from the orientation sensor 60 are also contemplated.

The orientation sensor 60 is a device for detecting the orientation of the transponder 20 and outputting a signal representative of that orientation. The orientation signal 20 may include acceleration readings, relative accelerations as compared to a reference, angular orientation readings, or any other such data representative of orientation. In some example embodiments, the orientation sensor 60 may be a gyroscope or accelerometer. In some example embodiments, the orientation sensor 60 is a 3-axis accelerometer, and the orientation signal 62 is X, Y, Z axis acceleration data. Through the X, Y, Z axis acceleration data, which will include gravitational forces along each of the axes, the orientation of the transponder 20 will be known. Vehicular acceleration or deceleration may affect the measurements and post-measurement processing may be used to try to counter the impact of vehicle movement on the measurements, as will be discussed further below.

The controller 54 is configured to receive the orientation signal 62 and to store orientation data 72 based on the orientation signal 62 in the memory 56. In some cases, the orientation data 72 is the information in the orientation signal 62. For example, the orientation signal 62 may contain X, Y, and Z acceleration readings, and the controller 52 may store these readings explicitly in memory. In yet other embodiments, the controller 54 may process the information contained in the orientation signal 62 and may store as orientation data 72 information based on the orientation signal. For example, the controller 54 may compare the X, Y, Z accelerations to one or more threshold values, and may store as orientation data 72 an indicator as to whether the transponder 20 is correctly orientated. If the accelerations fall within predefined thresholds, then the transponder may be oriented correctly and such an indication may be stored in memory. In yet other implementations, multiple thresholds may be predefined and the indications may include relative indications of orientation quality such as “good”, “marginal”, “poor”, or similar indicia. In yet further embodiments, the controller may only store orientation data 72 if the orientation is deemed incorrect, so as to be able to report the incorrect orientation.

The orientation data 72 is stored in the memory 56 as part of the transponder information 70.

It will be appreciated that the acceleration or deceleration of the vehicle may be detectable by the orientation sensor 60, such as an accelerometer, and may impact the forces measured by the accelerometer. These forces will only occur during periods during which the vehicle is accelerating or decelerating; however, in some instances of rapid acceleration or deceleration the forces may be large enough to impact the orientation measurements. In some embodiments, the controller 54 may be configured to read multiple values over a certain time period and to average the values or filter outlier values to eliminate the effect of vehicular acceleration. Over long periods of time, the vehicle acceleration should be zero. It may also be possible to isolate the gravitational component from a series of measurements on the basis that the gravitational component should remain constant (assuming the transponder itself is not moved), while the vehicular component will vary with time. Accordingly, a series of measurements could be low pass filtered to remove or minimize the vehicular component. Large short-term changes in measurements on two or more axes may be deemed to be related to movement of the transponder itself (for example, if it were repositioned in the vehicle). This may be interpreted by the controller 54 as a change in position, meaning the controller 54 may not use any orientation measurements prior to the large change since those measurements would correspond to a different orientation than the current orientation.

The controller 54 is configured to respond to a detected polling or trigger signal by causing the transceiver 52 to generate and transmit a response signal using the antenna 50. The response signal includes the transponder information 70, which the controller 54 reads from the memory 56. As detailed above, the transponder information 70 may include transponder specific data, including a serial number or other identifier. It may also include information such as an identifier of the last entry/exit point or toll plaza used on the toll road, a time of last use, or other such volatile data. In accordance with the present application the transponder information 70 further includes orientation data 72.

As noted above the orientation data 72 may include explicit orientation information, such as 3-axis accelerometer readings of force, or it may include relative orientation information, such as an indication as to whether the orientation was determined by the controller 54 to be correct or not, or a quantitative or qualitative indication of the degree to which the orientation deviates from the desired orientation.

In some embodiments, the transponder 20 may include an output indicator 80. The output indicator 80 may include a visual indicator, such as one or more LEDs, or an auditory indicator, such as a speaker. The controller 54 may be configured to cause the output indicator 80 to generate a predefined output based on the orientation signal 62. For example, if the controller 54 determines from the orientation signal 62 that the transponder 20 is incorrectly oriented, then the controller 54 may illuminate a red LED to indicate to the driver or other persons that the transponder 20 should be adjusted in its orientation. In some cases, the indication of an incorrectly oriented transponder may include output of an auditory warning sound, or any other such auditory or visual indication. In some instances, the controller 54 may be configured to cause output of a different signal to signify a correct orientation; for example, illumination of a green LED or the like.

In one embodiment, the controller 54 is configured to prevent communications with the ETC system in the event that the controller 54 determines from the orientation signal 62 that the transponder 20 is incorrectly oriented. The controller 54 also illuminates an LED or provides some other output indication that alerts the vehicle occupants to the fact that the transponder 20 is not functional and needs to be oriented if they wish to use the transponder 20 for ETC transactions.

In some embodiments, the transponder 20 may further include an input device 82, which may include a button, switch, key, or other user interface device through which a signal may be sent to the controller 54. The input device 82 may, in some embodiments, be a “reset” button for triggering the transponder 20 to assess its orientation and, if determined to be within predefined thresholds, to permit proper operation with the ETC system. Further details of this example implementation are described below in connection with FIG. 6.

Figure 3:
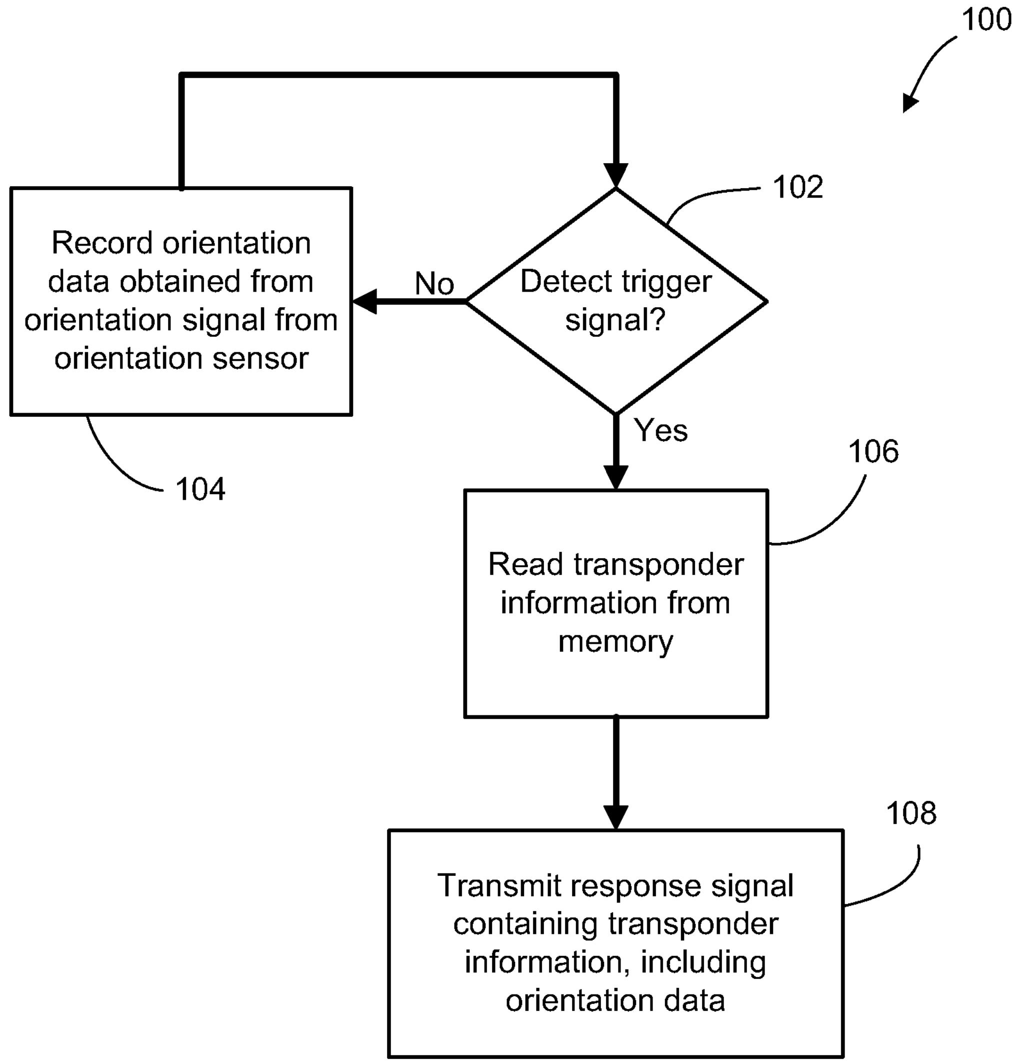
FIG. 3 shows, in flowchart form, an example method of detecting and reporting transponder orientation.

Reference is now made to FIG. 3, which shows, in flowchart form, an example method 100 for determining and reporting orientation of a transponder. The method 100 is carried out by the in-vehicle transponder; and in particular, by the controller and associated electronics within the transponder.

The method 100 includes an operation 102 of awaiting a polling or trigger signal. While awaiting a polling or trigger signal, the transponder obtains orientation information from the orientation sensor and stores orientation data in memory, as indicated by operation 104. As noted above, the orientation sensor and controller may be configured to obtain and store in memory orientation data on a periodic basis, such as every minute, five minutes, twenty minutes, etc. In some instances, the controller may be configured to overwrite the previously stored orientation data in memory with new orientation data at every read operation. In some other instances, the controller may be configured to store a history of orientation data in memory. The history may be limited to a certain number of recent orientation reads, such as five or ten. In some cases, the controller may only store additional orientation data if it differs from previous data by more than a threshold amount, thereby indicating a recent change in orientation.

If, in operation 102, a polling or trigger signal is detected then in operation 106 the controller reads transponder information from memory. The transponder information includes transponder-specific details such as an identifier. It further includes the stored orientation data.

In operation 108, the transponder generates and sends a response signal in reply to the polling or trigger signal. The response signal includes the transponder information and, thus, the orientation data.

The ETC system thereby receives orientation data from the transponder and is thus able to gather statistics regarding the orientations of transponder passing through the system and being successfully detected. In some instances, a handheld reader may be used to poll or trigger a transponder in accordance with the method 100 to obtain transponder orientation history and thereby assess whether a missed transaction was due to mis-orientation of the transponder.

Figure 4:
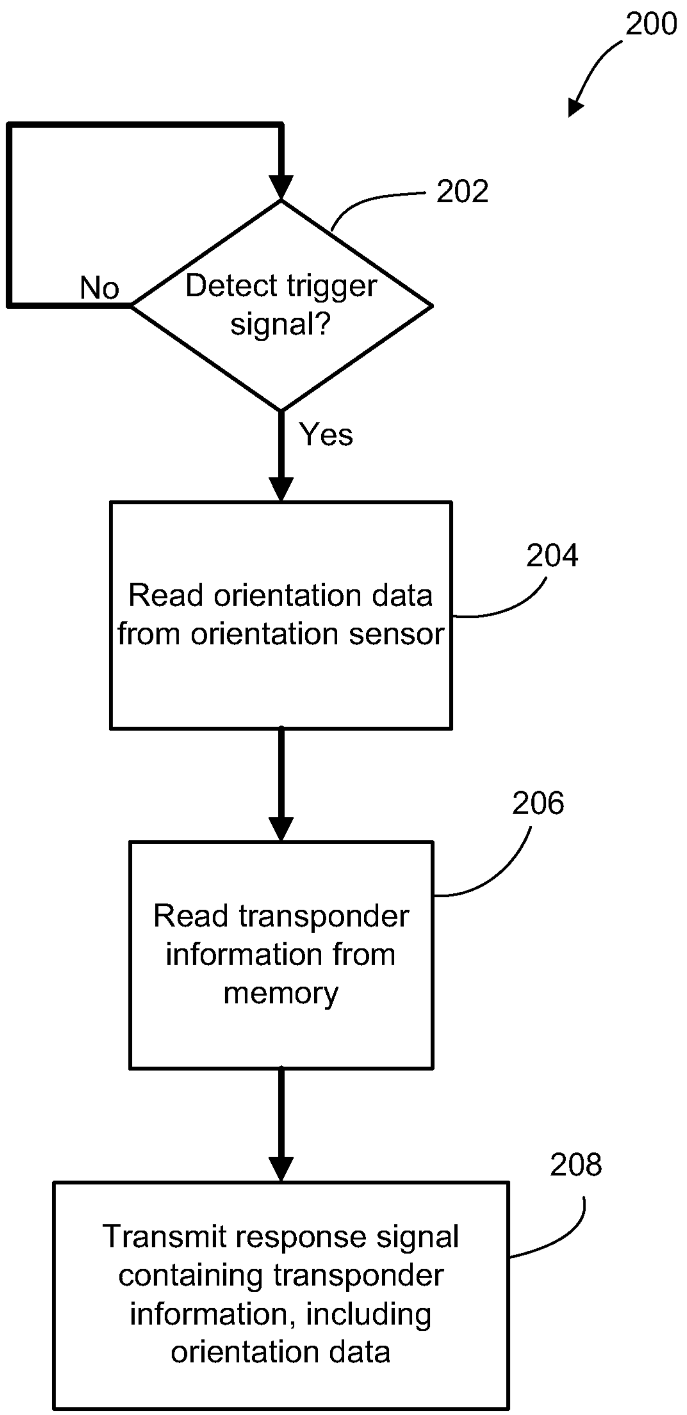
FIG. 4 shows, in flowchart form, an alternative example method of detecting and reporting transponder orientation.

Reference is now made to FIG. 4, which shows an alternative example method 200 of determining and reporting orientation. In the alternative example method 200, the transponder awaits detection of a trigger signal in operation 202 before it reads and stores orientation data in operation 204. This alternative method 200 may be implemented in gated toll embodiments in which the vehicle and transponder are traveling through the toll area at lower speeds, thereby affording the transponder time to read the orientation sensor dynamically to determine a current orientation. In some instances, it may be implemented in open road tolling if the reading of the orientation sensor is sufficiently fast.

In operations 206 and 208 the transponder information is read from memory and sent to the ETC system in a response signal. The response signal includes the orientation data obtained in operation 204.

Depending on the implementation, it will be appreciated that the orientation data stored in memory on the transponder may include orientation data taken at one or more previous times. In some cases, the orientation data sent in the response signal may include the orientation data from one or more of these previous reads. In some cases, the response signal may include future data. In yet other cases, the controller may perform filtering, such as averaging, and may report an average orientation reading (such as for each axis), so as to remove noise.

The orientation data may include explicit orientation measurements, e.g. measured acceleration forces, or qualitative assessments of orientation, e.g. correct/incorrect. The orientation data may further include timestamps to pinpoint the time at which the orientation was measured.

Figure 5:
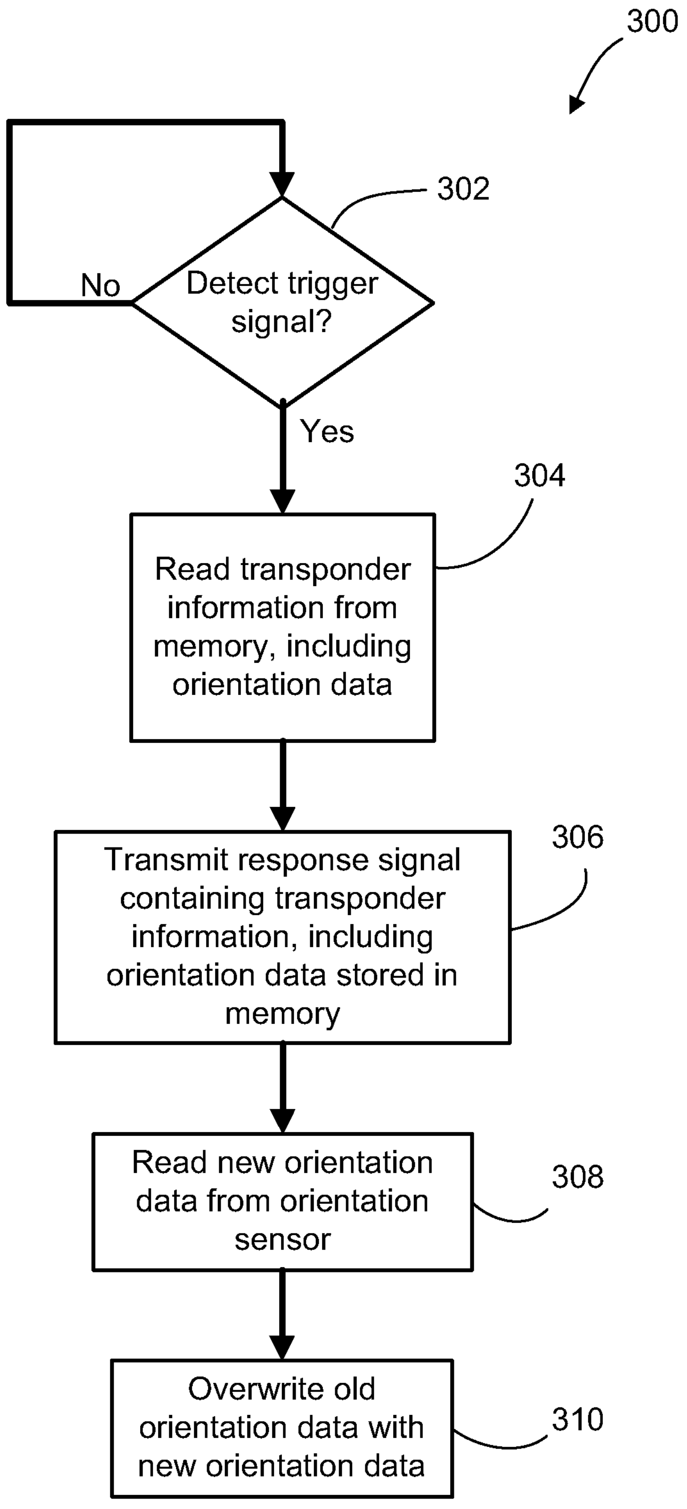
FIG. 5 shows, in flowchart form, a further example method of detecting and reporting transponder orientation.

The orientation of the transponder, and the consequent impact on the transponder's ability to communicate, is most relevant when the transponder is in a capture zone. Accordingly, in some embodiments, the orientation data is obtained from the sensor whenever the transponder receives/detects a poling or trigger signal. Reference is now made to FIG. 5, which shows another example method 300 for determining and reporting orientation of an ETC transponder.

The method 300 begins in operation 302 with detection of a polling or trigger signal. Because many ETC systems have relatively short capture zones and/or a protocol that requires a transponder response within a preset window of time after transmission of the polling or trigger signal, there may be insufficient time for the controller to obtain orientation data from the sensor for inclusion in the response signal. Accordingly, in operation 304, the controller obtains the orientation data from memory where it was stored after a previous read operation. The controller sends a response signal in operation 306, where the response signal contains the transponder information, which in this case includes the stored orientation data. In operations 308 and 310, in response to the fact that a trigger signal was received, the controller obtains new orientation data from the sensor and then overwrites the old data in memory. A difference between this embodiment and the embodiments described in connection with FIGS. 3 and 4, is that the reading of the sensor is done in response to receipt of a trigger signal (i.e. when the transponder is in a capture zone), but the controller need not await the obtaining of that data before responding to the trigger signal. Accordingly, the transponder will be reporting its orientation at the previous trigger signal to the ETC system. In many ETC systems, a transponder may receive multiple polling/triggers signals as it traverses a capture zone. This may mean that the first response signal sent to the ETC system will include orientation data from the last capture zone, but that subsequent response signals may include up-to-date orientation data that the controller has obtained and stored after detecting the trigger signal. In some embodiments the delay inherent in obtaining sensor data and overwriting the previously stored orientation data with new orientation data may be such that it cannot be updated after every trigger signal in a capture zone, but is only updated every two, three or more trigger signals.

Figure 6:
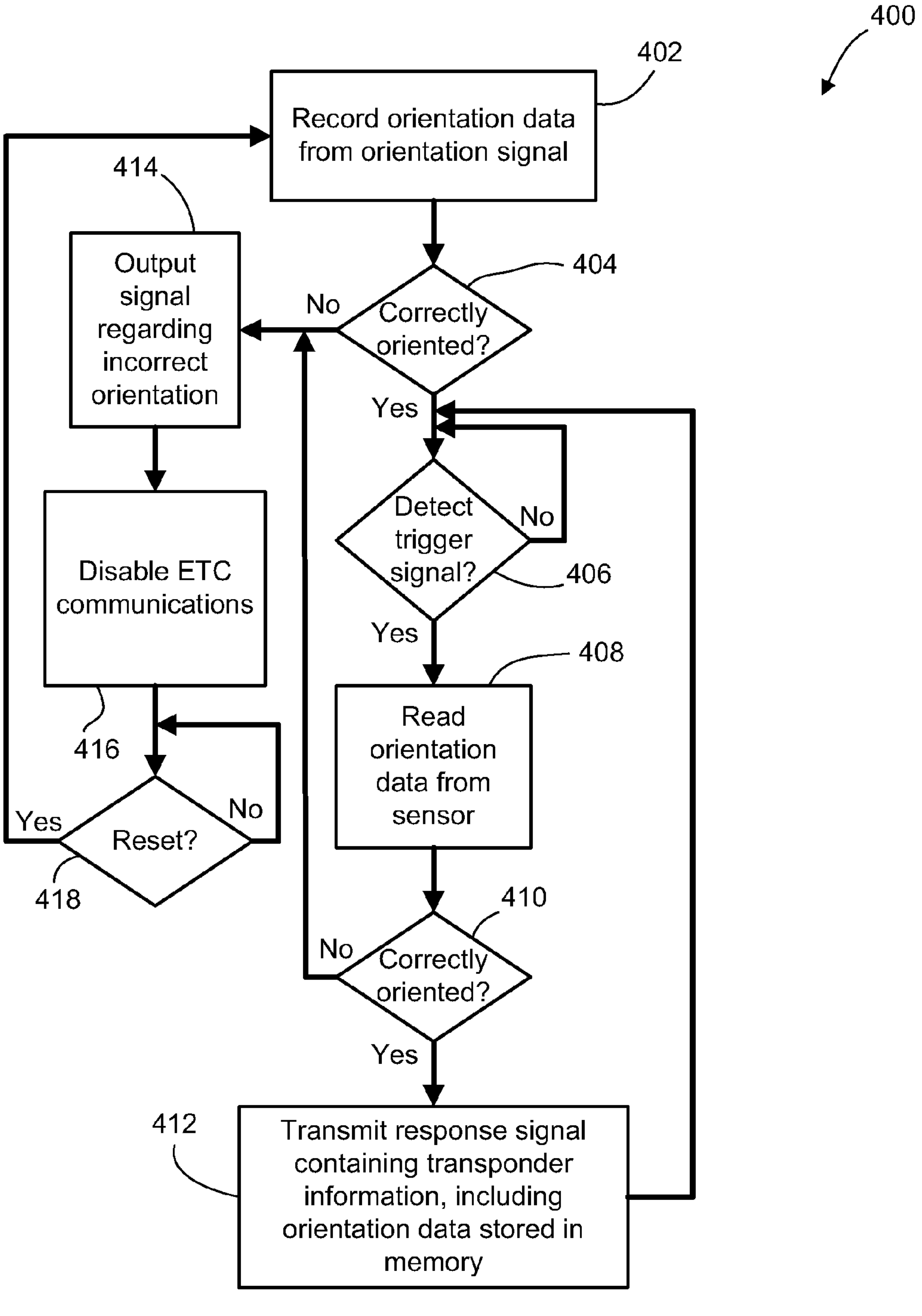
FIG. 6 shows, in flowchart form, an example method for enforcing correct orientation of a transponder.
Figure 7:
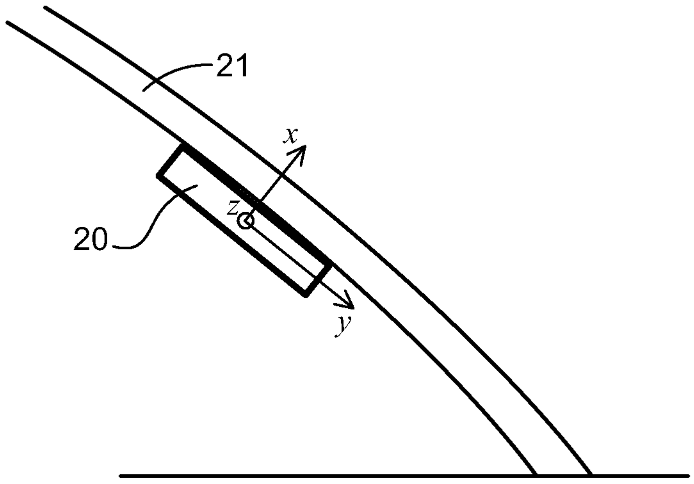
FIG. 7 diagrammatically shows a side view of a transponder mounted to the interior of a windshield.

Reference is now made to FIG. 6, which shows, in flowchart form, a further example process 400 for ensuring correct orientation of the transponder 20. In this example process 400, the transponder 20 is configured to read the orientation data from the orientation sensor in operation 402. This operation 402 may be triggered by a reset button, the transponder 20 being powered-up or having a battery inserted, or by some other event. The transponder 20 then assesses the orientation data to determine whether the transponder 20 is correct oriented, as indicated by operation 404. In this regard, "correctly oriented" means comparing the orientation data to a range or set of thresholds to determine whether the orientation falls within an acceptable range of positions. The transponder 20 stores a set of predetermined thresholds or ranges against which it compares the orientation data. For example, in the case of a three-axis accelerometer, each axis may have a range of values that indicate that the transponder is generally, within tolerances, oriented in the correct fashion. Reference may be made, for example, to FIG. 7, which illustrates a side view of an example transponder 20 attached in correct orientation to the interior of a windshield 21. In this example, the coordinate convention for the accelerometer within the transponder 20 is as indicated on the diagram. With this convention, when the transponder 20 is correctly oriented the y-axis will generally measure a positive acceleration in the y-direction, the x-axis will generally measure a negative acceleration in the x-direction, and the z-axis will generally measure zero acceleration. The suitable ranges and tolerances may be application specification. In one example, the range of acceptable measurements for the y-axis is between +1 g and +0.2 g, the range for the x-axis is between −0.0 g and −0.8 g, and the range for the z-axis is between −0.3 g and +0.3 g. If the measurements read from the sensor on any of the three axes fall outside of their respective permitted ranges, then the transponder 20 may determine that it is incorrectly oriented. It will be appreciated from this description that other ranges may be used and that techniques, such as those described above, for minimizing the impact of vehicular acceleration on the measurements may be employed.

Reference is again made to FIG. 6. If, in operation 404, the orientation is determined to be correct, then the transponder 20 awaits a trigger signal from the ETC system. In operation 406, if a trigger signal is detected, then the transponder 20 reads orientation data from the orientation sensor 410. The transponder determines whether it is correctly oriented in operation 410. If the orientation of the transponder has changed, such that it is no longer correctly oriented, then operation 410 leads to operation 414. However, if the orientation remains correct, then the transponder 20 responds to the trigger signal with a response signal containing transponder information and orientation data in operation 412. The transponder 20 then awaits another trigger signal.

It will be understood from the preceding discussion of examples, that the operations 408 and 412 may be varied so that the transponder 20 sends a response signal containing previously recorded orientation data from the last trigger event, and then reads and overwrites that orientation data with new orientation data. The transponder 20 would then assess the correctness of the new orientation data in operation 410. It will also be understood that the transponder 20 may filter the data or otherwise process the data before reporting.

If, in operations 404 or 410, the transponder 20 determines that it is incorrectly orientated (i.e. that one or more measurements are outside the predefined ranges or thresholds), then in operation 414 the transponder 20 generates an output signal indicative of the incorrect orientation. The output signal may include illuminating an LED, outputting an error message on a display, outputting an audible warning sound, or other sensory outputs. The output signal alerts the vehicle occupants to the fact that the transponder 20 is incorrectly oriented and will not function correctly until properly oriented.

The transponder then, in operation 416, disables ETC communications. That is, the transponder 20 enters a state in which it will not transmit response signals if it detects a trigger signal. In some embodiments, the transponder 20 may also cease detecting trigger signals in this state. In one embodiment, the transponder 20 ceases to operate with the ETC system until a reset button or other such input device is activated, as shown in operation 418. If a reset button is activated (which may include removal and reinsertion of the battery—i.e. deactivating and repowering the device on), then the transponder 20 re-performs the orientation assessment of operations 402 and 404 to determine whether it is now correctly oriented. If not, then it will be disabled again.

In another embodiment, rather than await a reset signal, the transponder 20 simply continues to listen for trigger signals and, upon detection of a trigger signal, repeats the assessment of orientation in operations 402 and 404 to determine whether orientation has been corrected.

In one variation, the transponder 20 is not configured to report the orientation data to the ETC system in operation 412, but rather it simply relies on the orientation data to disable the transponder 20 when incorrectly oriented to prevent error-prone low-quality communications as indicate by operation 416.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A vehicular electronic toll collection (ETC) transponder, comprising:

an antenna; a controller, including a transceiver connected to the antenna for receiving and sending RF signals;

an orientation sensor configured to output an orientation signal regarding an orientation of the transponder; and a memory storing transponder information, wherein the controller is configured to receive the orientation signal from the orientation sensor and, in response thereto, to store orientation data in the memory, and wherein the controller is configured to transmit an RF response signal via the antenna in reply to receipt of a polling signal from an ETC roadside reader, and wherein the RF response signal includes the transponder information and the orientation data.

2. The transponder claimed in claim 1, wherein the orientation sensor comprises an accelerometer.

3. The transponder claimed in claim 2, wherein the orientation sensor comprises a tri-axis accelerometer, and wherein the orientation signal includes acceleration measurements for X, Y, and Z-axes.

4. The transponder claimed in claim 1, wherein the orientation signal contains measurement data, and wherein the orientation data stored in memory is the measurement data.

5. The transponder claimed in claim 1, wherein the orientation signal comprises measurement data, and wherein the orientation data comprises indicia of whether the transponder is oriented correctly based upon a comparison of the measurement data with a predefined threshold value.

6. The transponder claimed in claim 1, wherein the controller is configured to store a time at which the orientation signal was received in memory in association with the orientation data.

7. The transponder claimed in claim 1, wherein the orientation data comprises acceleration measurements on three axes.

8. The transponder claimed in claim 7, wherein the orientation data further comprises a timestamp associated with the acceleration measurements.

9. The transponder claimed in claim 1, wherein the orientation sensor is configured to output the orientation signal periodically.

10. The transponder claimed in claim 1, further comprising an output indicator, and wherein the controller is configured to compare the orientation signal to a threshold value to determine whether the transponder is incorrectly oriented and, if the controller determines that the transponder is incorrectly oriented, to activate the output indicator.

11. The transponder claimed in claim 10, wherein the output indicator comprises a light.

12. The transponder claimed in claim 1, wherein the transponder includes a mounting device for attaching the transponder to the interior of a vehicle windshield.

13. The transponder claimed in claim 1, wherein the controller is configured to compare the orientation signal to a threshold value to determine whether the transponder is incorrectly oriented, and to disable communications with the ETC if the transponder is determined to be incorrectly oriented.

14. A method of determining orientation of an electronic toll collection (ETC) transponder, the ETC transponder including an orientation sensor, an antenna, memory storing transponder information, and a controller connected to the antenna for receiving and sending RF signals with a roadside reader in an ETC system, the method including:

receiving an orientation signal from an orientation sensor mounted within the transponder, wherein the orientation signal contains information indicating an orientation of the transponder;

storing orientation data within the memory based on the orientation signal; and in response to receipt of a trigger signal from the roadside reader, generating and transmitting an RF response signal, wherein the RF response signal contains includes transponder information and the orientation data.

15. The method claimed in claim 14, further comprising measuring the orientation of the transponder and generating the orientation signal based on the measured orientation.

16. The method claimed in claim 15, wherein the orientation signal includes acceleration measurements on three axes.

17. The method claimed in claim 16, wherein the orientation data comprises the acceleration measurements.

18. The method claimed in claim 15, further comprising comparing the measured orientation to a threshold value and generating an assessment of the correctness of the orientation based on the comparison, wherein the orientation data comprises the assessment.

19. The method claimed in claim 14, wherein storing the orientation data includes storing a timestamp in memory in association with the orientation data.

20. The method claimed in claim 14, further comprising comparing the orientation data to a threshold value to determine whether the transponder is incorrectly oriented and, activating an output indicator on the transponder if the transponder is determined to be incorrectly oriented.

21. The method claimed in claim 14, comparing the orientation data to a threshold value to determine whether the transponder is incorrectly oriented and, disabling communications with the ETC system if the transponder is determined to be incorrectly oriented.

* * * * *